April 24, 1956 — F. L. BAXTER, JR — 2,742,983
BRAKE TYPE CENTRIFUGAL GOVERNOR
Filed Nov. 22, 1950

INVENTOR
FREDERIC L. BAXTER, JR.
BY Arthur H. Serrell
his ATTORNEY

United States Patent Office 2,742,983
Patented Apr. 24, 1956

2,742,983

BRAKE TYPE CENTRIFUGAL GOVERNOR

Frederic L. Baxter, Jr., Cos Cob, Conn., assignor to Sperry Rand Corporation, a corporation of Delaware Application November 22, 1950, Serial No. 196,995

4 Claims. (Cl. 188—185)

This invention relates to a centrifugal governor of the brake type operable to maintain a close degree of speed regulation particularly for relatively small electric motors. The improved governor effects regulation by frictionally dissipating some of the power of the motor at the design speed, and changing this dissipation as required under varying operating and load conditions. A speed regulation to within .1% has been obtained by the improved governor in use with motors of the character noted.

The governor constructed in accordance with the present invention includes a stationary or fixed part in the form of a brake drum. The movable part of the governor is rotated at a speed corresponding to the speed of the motor and includes two spring connected masses both of which are responsive to centrifugal force. One of the masses is a spring restrained brake shoe that frictionally engages the drum to dissipate energy at the synchronous speed of the governor. The other of the masses complements the operation of the brake shoe mass through its spring connection thereto, the arrangement being such that the shoe and drum dissipate more energy when the speed of the motor tends to exceed the design speed or the load thereon decreases from a normal condition. Less energy is dissipated by the frictionally engaged parts of the governor when the noted conditions change in a reverse sense.

In accordance with the invention, the energy dissipated by the governor primarily varies with change in the displacement of the freely movable mass thereof.

Other features and details of the invention will be apparent from the following description when read in relation to the accompanying drawing wherein.

Figure 2:
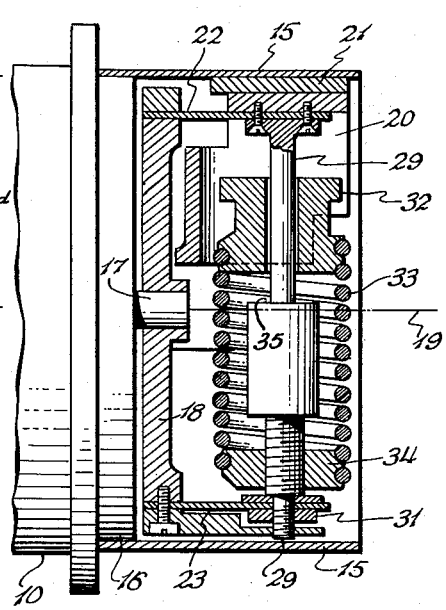
Fig. 2 is a section view taken on line 2—2, Fig. 1, this figure also showing a side elevation of a portion of the housing of an electric motor whose drive shaft is connected to the governor.

With reference to Fig. 2, the governor constructed in accordance with the present invention is shown as directly driven by the shaft of an electric motor whose housing is indicated at 10. The motor may be a D. C. motor supplied with electrical energy from a suitable source, not shown. The driving motor for the governor may be coupled to a variable load (not herein shown) by way of its drive shaft. Fluctuations in the line voltage supplied the motor or variations in the load thereon tend to result in changes in speed of the motor. The improved governor functions to regulate the motor under the noted changing conditions to maintain the speed of the motor at its designed operating speed.

As shown in Fig. 2, the improved governor may include a stationary or fixed part in the form of a brake drum 15, one end of which fits on a guide flange 16 provided on the end of the housing 10 or casing of the motor. An extension of the shaft of the motor is indicated at 17. The moving part of the governor includes a rotary driven element 18 fixed to shaft 17 and, in this instance, rotated about axis 19 at a speed that is the same as the speed of operation of the motor. The connection between element 18 and shaft 17 is clearly shown in Fig. 2.

Mounted on element 18 for radial movement relative to the axis 19 of the element responsive to centrifugal force is a spring restrained mass 20. As shown, the mass 20 includes a brake shoe 21 thereon which engages the drum 15 at the design speed of the governor to provide an energy dissipating frictional torque about the axis 19. The centrifugally responsive brake shoe or mass 20 is mounted on the driven element by a pair of parallel spaced flat springs 22, 23 as particularly shown in Fig. 2. The spaced springs 22, 23 permit radial movement of the mass 20 relative to the axis 19. Further, the parallel springs 22, 23 are connected to element 18 in equidistantly spaced and oppositely disposed relation to the axis 19. The mass 20 is restrained by preloading spring means in the form of coil springs 24, 24', Fig. 1. The springs 24, 24' engage the fixed posts 25, 25' extending from the rotary element 18 and are effective by way of the rods 26, 26' fixedly connected to the mass 20. The rods 26, 26' are held in spaced parallel relation, in this instance, by a suitable spacer plate 27, Fig. 1. The rods 26, 26' may be screw threaded as shown to accommodate the adjusting nuts 28, 28' thereon which directly contact the free ends of the respective springs 24, 24'. The compression load placed on the springs 24, 24' is determined by the setting of the adjusting nuts 28, 28', the load being such as to maintain the shoe 21 in a position free of engagement with the drum until the governor is substantially at design speed.

Figure 3:
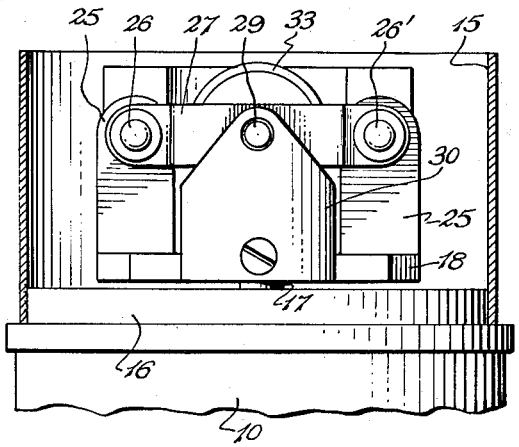
Fig. 3 is a side elevation of the rotary part of the governor.
Figure 4:
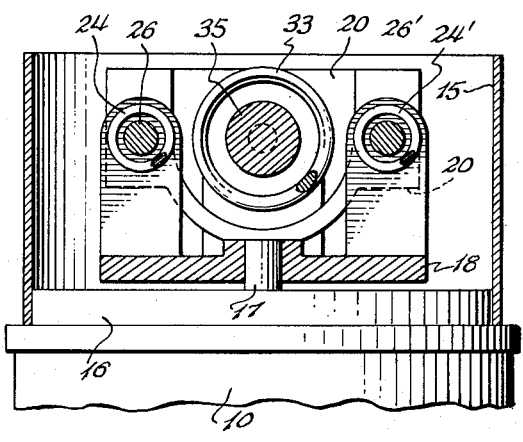
Fig. 4 is a sectional view taken on line 4—4, Fig. 1.

A rod 29 arranged diametrically in relation to the axis 19 also forms a portion of the shoe or mass 20. Rod 29 may be connected to the mass 20 in a suitable manner as particularly shown in Fig. 2. To prevent the rod 29 from engaging the drum 15 due to the action of the preloaded springs 24, 24' when the governor is at rest, a limit stop 30 is provided fixed to element 18, as shown in Figs. 2 and 3. The mounting nut 31 fastened to the threaded end of rod 29 and connecting the flat spring 23 to the mass 20 engages the stop 30 to limit the movement of the mass 20 when this condition exists. Mass 20, rods 26, 26', 29, and plate 27 provide a double ended part for the governor that is translatable radially of the axis 19 whose center of mass is eccentric relative to the axis.

The improved governor further includes a second mass 32 movable relative to the element 18 responsive to centrifugal force in a direction radial to the axis 19. Mass 32 is connected to mass 20 by means of rod 29 and an interconnecting coil spring 33. One end of spring 33 is connected to an adjustable nut 34 on rod 29. As shown in Fig. 2, spring 33 is arranged in concentric relation to the rod 29 and an opening in the mass 32 through which the rod 29 extends permits movement of the mass 32 radially. When the governor is at rest, mass 32 assumes a position displaced from axis 19 by engagement with the adjacent surface of an enlarged portion 35 of the rod 29, the nut 34 being set so that the spring 33 is under no tension at such time. The governor is designed so that during operation mass 32 assists the operation of the shoe or mass 20 in changing the energy dissipated by the frictional engagement of the parts. The motion of mass 32 responsive to centrifugal force is not limited in the operating range of the governor. The second mass 32 is arranged relatively to the element 18 to complement the action of the described translatable part having the eccentric mass 20 thereon responsive to centrifugal force.

The motion of mass 20 is limited by means of a friction element such as brake shoe 21. The other element of the limiting means is the fixed brake drum 15.

Figure 1:
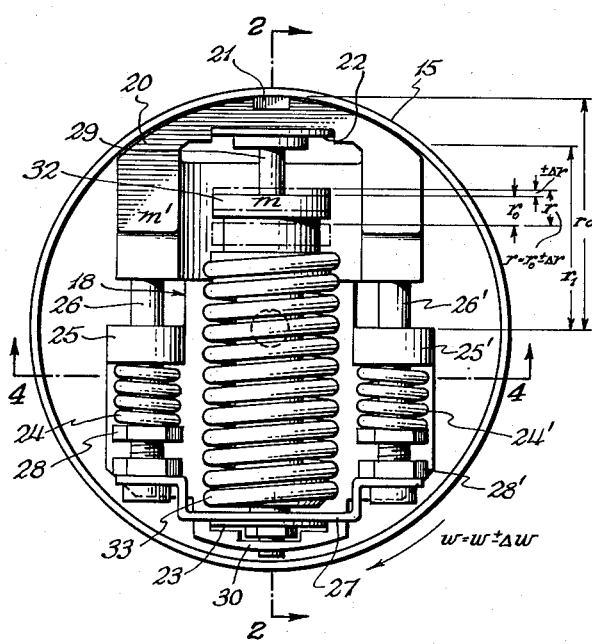
Fig. 1 is an end elevation of the improved governor.

With reference to Fig. 1, the governor is constructed so that at the designed angular speed ($w_0$), the mass 32 ($m$) is displaced by the distance ($r_0$) from its position of rest and the centrifugal force acting on the mass is balanced by the opposing force of spring 33. The mass 32 ($m$) and constant ($k$) of spring 33 are chosen so that $w_0^2 = k/m$ and 32 ($m$) is positioned radially of the axis 19 in a stable condition at design speed.

The centrifugal force $Fc$ acting radially on the mass 20 ($m^1$) of the governor is equal to the product of mass ($m^1$), $r_1$, the radius from the center of mass of $m^1$, and the square of ($w$) the angular speed about the axis of the rotary element 18.

$$Fc = m_1 r_1 w^2$$

Further, radial force $Fs$ on 20 ($m^1$) due to the connection of 20 ($m^1$) to 32 ($m$) through spring 33 may be expressed by the equation $$Fs = m w_0^2 r$$

where ($r$) is the deflection of spring 33, ($m$) is the mass 32 and ($w_0$) is the angular speed of element 18 at the designed speed of the motor.

The springs 24 and 24' are set by their adjusting nuts so that at speed ($w_0$), the mass 20 ($m^1$) is displaced as far as possible with the brake shoe 21 in frictional contact with the drum 15. Flat springs 22 and 23 cause a negative radial or centripetal force $Fo$ to act on mass 20 ($m^1$) at this time.

The total radial force ($Ft$) acting on 20 ($m^1$) may be expressed as $$Ft = m^1 r_1 w^2 + m w_0^2 r - Fo$$

The frictional retarding or dissipating torque $T_1$ produced by the force between the contacting parts is $$T_1 = u r_d F_t$$

where ($u$) is the coefficient of friction and ($r_d$) is the inner radius of the stationary drum 15. Then the frictional torque is $$T_1 = m^1 r_1 w^2 u r_d + m w_0^2 r u r_d - u r_d F_o$$

The accelerating torque $T_2$ acting on the governor is $$T_2 = T_m - T_d - K_0 w^2$$

where $T_m$ = driving torque of the motor, $T_d$ = load torque, and $K_0 w^2$ = viscous friction torque due to windage, bearings, etc. and where $K_0$ is the friction coefficient. The total acceleration torque ($T$) acting on the governor is the difference between $T_2$ and $T_1$, $$T = T_2 - T_1 = T_m - T_d + u r_d F_o - (u m_1 r_1 r_d + K_0) w^2 - (u m w_0^2 r_d r)$$

with $r = r_0 + \Delta r$ (see Fig. 1) and $w = w_0 + \Delta w$ and neglecting terms in $\Delta w^2$ the total acting torque may be written $$T = T_m - T_d + u r_d F_o - \tfrac{1}{2} K_2 w_0 - K_1 r_0 - K_1 \Delta r - K_2 \Delta w$$

where $K_1 = u m w_0^2 r_d$ and $K_2 = 2(u m_1 r_1 r_d + K_0) w_0$.

The adjustment of springs 24 and 24' is made so that at any selected value of $r_0$, a constant component of external torque designated as $T_c$ approaches zero. Thus $$T_m - T_d + u r_d F_o - \tfrac{1}{2} K_2 w_0 - K_1 r_0 = T_c$$

A change in the driving torque $T_m$ of the motor or the load torque $T_d$ may make $T_c$ other than zero and hence this term is retained in the equation for T which may now be indicated as $$T = T_c - K_1 \Delta r - K_2 \Delta w$$

where $K_1 \Delta r$ is the component of torque proportional to the displacement of the movable mass 32 $m$ from its position $r_0$ and $K_2 \Delta w$ is the component of torque proportional to the variation in angular speed of the rotating driven element 18 of the governor from $w_0$.

The governor has been shown to be subject to the torque, $T_c$, expressed in equation of column 3 line 72. If the dynamical equations of this system are written down and separated so as to obtain equations for $\Delta r$ and $\Delta w$ it will be seen that under the influence of an external torque, $T_c$, the displacement $\Delta r$ from its equilibrium position is given by:

$$\Delta r = \frac{1}{K_1} T_c$$

If this external torque is of constant magnitude or of a magnitude which changes linearly with time there is no deviation, $\Delta w$, from the design speed, $w_0$. If the external torque changes quadratically with time, having a second derivative equal to $a_2$, then the speed deviation $\Delta w$ is given by:

$$\Delta w = \frac{a_2}{2 K_1 w_0 r_0}$$

It is noted that $K_2$ does not enter the equations for the steady state deviations $\Delta r$ and $\Delta w$. $K_2$, however, does enter the dynamical equations for $\Delta r$ and $\Delta w$, and therefore, enters the inequality which must be satisfied for system stability. This inequality is $$\frac{K_2}{K_1} > r_0 \frac{(1 + P_0)}{2 w_0}$$

where $$P_0 = \frac{I_0}{m r_0^2}$$

and $I_0$ is the moment of inertia of the rotating part of the governor.

To appreciate the manner in which the governor operates so as to perfectly regulate speed even under the action of externally impressed torque, it is understood that the mass, $m$, is at equilibrium at any radius, $r$, provided the speed of the system is $w_0$. Further, it is understood that if the external torque is suddenly increased to a new value thereby tending to accelerate the governor, the speed, $w$, temporarily increases thereby subjecting the mass, $m$, to an unbalanced radial force which has the effect of increasing the pressure between the brake shoe and the brake drum of the governor. The increased dissipation of energy associated with this increased pressure is just sufficient to balance the increase in energy delivered to the governor by the externally impressed torque. Therefore, the speed of the governor decreases toward its synchronous speed, $w_0$. After a short time, determined by the time constant of the governor, the governor's speed is again $w_0$. The mass, $m$, is now displaced slightly from its equilibrium position, but since the speed of the governor is $w_0$, no unbalanced radial forces are acting on $m$. Therefore, a new equilibrium position will be attained in which the mass, $m$, is displaced sufficiently to dissipate all the energy supplied to the system by the externally impressed force, and the speed of the governor is maintained at $w_0$.

If the external torque varies linearly with time a similar set of conditions result except that now the mass, $m$, must move radially at a constant speed and thereby increase $\Delta r$ in a linear fashion in order to dissipate the increasing energy flowing into the system and hence to maintain the speed of the governor at $w_0$. Thus, under the action of a suddenly impressed external torque which is either constant or linearly varying with time, the speed of the governor deviates from its synchronous speed only during the transient state, but regains its synchronous speed, $w_0$, in the steady state.

Under the action of an external torque which has non-vanishing derivatives of higher order than the first, the mass, $m$, experiences a radial acceleration, and because of the inertial lag associated with this acceleration, is unable to maintain the speed of the governor at $w_0$ and, hence, the governor fails to regulate perfectly in this case.

In operation, the improved governor is capable of dissipating all externally supplied energy by unaccelerated movements of the regulating mass, $m$, provided that the energy supplied to the system is associated with a torque whose second and higher derivatives vanish and, further, that this dissipation of energy does not require that the speed of the governor deviate from its synchronous speed except in the transient state.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a governor having a rotary driven element with an axis; a double ended part translatable radially of the axis of the element having a mass eccentric to the axis of the element, and a mounting for said part on the element comprising a pair of parallel flat springs fixedly connected to said element in equidistantly spaced and oppositely disposed relation to the axis, one of which is fixedly connected to one end of said translatable part and the other of which is fixedly connected to the other end of said translatable part.

2. A brake type centrifugal governor having a cylindrical brake drum and a rotary driven element with an axis corresponding to the axis of the drum; a part providing a first eccentric mass with two ends adjacent said drum, mounting means connecting said part and element whereby the part is movable radially of the axis of the element responsive to centrifugal force, a brake shoe at one end of said part frictionally engaging the drum continuously when the governor is operating at design speed, a second mass eccentric to the axis of the element movable radially of the axis responsive to centrifugal force, and a spring connecting said second mass with the other end of the first eccentric mass part to vary the frictional engagement between the brake shoe and drum and thereby maintain the governor at its design speed.

3. A governor of the character claimed in claim 2, in which said mounting means connecting the part and element includes pre-loading spring means, and said element has a fixed stop thereon, adjacent the drum in a position to engage the other of the ends of the first eccentric mass of the governor to thereby limit its movement as influenced by said pre-loading spring means.

4. A brake type centrifugal governor having a cylindrical brake drum and a rotary driven element with an axis corresponding to the axis of the drum; a part providing a first eccentric mass with two ends adjacent the drum, mounting connecting said part and element whereby the part is movable radially of the axis of the element responsive to centrifugal force, said mounting means including pre-loading spring means between said element and part, a brake shoe at one end of said part frictionally engaging the drum continuously when the governor is operating at design speed, a second mass eccentric to the axis of the element movable radially of the axis responsive to centrifugal force, and a coil spring connected at one end to said second mass and connected at its other end to the other end of the first eccentric mass part to vary the frictional engagement between the brake shoe and drum and thereby maintain the governor at its design speed.

References Cited in the file of this patent

UNITED STATES PATENTS

| | | |
|---|---|---|
| 357,239 | Smalley | Feb. 8, 1887 |
| 1,067,454 | Atwood | July 15, 1913 |
| 1,519,473 | Zahm | Dec. 16, 1924 |
| 1,709,463 | Crafts | Apr. 26, 1929 |
| 2,244,494 | Mahaney | June 3, 1941 |
| 2,272,168 | Franks | Feb. 10, 1942 |
| 2,282,178 | Di Toro | May 5, 1942 |
| 2,441,811 | Gottlieb | May 18, 1948 |
| 2,489,688 | Vitoux | Nov. 29, 1949 |

FOREIGN PATENTS

| | | |
|---|---|---|
| 173,962 | Switzerland | Dec. 15, 1934 |